Patented Feb. 8, 1944

2,341,357

UNITED STATES PATENT OFFICE 2,341,357

POLYMETHINE DYE INTERMEDIATES

Leslie G. S. Brooker and Frank L. White, Rochester, N. Y., assignors to Eastman Kodak Company, Rochester, N. Y., a corporation of New Jersey No Drawing. Application November 8, 1940, Serial No. 364,907

20 Claims. (Cl. 260—289)

This invention relates to polymethine dye intermediates and to a process for the preparation thereof.

In United States Patent 2,112,139, dated March 22, 1939, we have described the preparation of ketones, useful as polymethine dye intermediates, by condensing cycloammonium quaternary salts, such as benzothiazole, benzoselenazole and naphthothiazole quaternary salts, containing a reactive methyl group, with an acyl halide, in the presence of an acid-binding agent. While the foregoing process gives good yields, it is limited in scope, as indicated in the patent, to compounds containing arothiazole and aroselenazole nuclei.

We have now found a new process for preparing ketones of the above referred to kind, which is capable of producing not only the above ketones, but also new ketones which were heretofore unavailable.

It is accordingly an object of our invention to provide a new process for preparing ketones. A further object is to provide new ketones. Other objects will become apparent hereinafter.

In accordance with our invention, we hydrolyze a N-alkyl or N-aryl heterocyclic nitrogen base containing a diacylmethylene group in the alpha or gamma position, i. e. in one of the so-called reactive positions. Advantageously the hydrolysis is carried out in the presence of an acid. Mineral acids, such as hydrochloric acid, phosphoric acid and sulfuric acid, are especially suitable. Heat accelerates the hydrolysis of the diacylmethylene compounds. The following examples will serve to illustrate our invention.

EXAMPLE 1.—*2-acetylmethylene-3-methylbenzothiazoline*

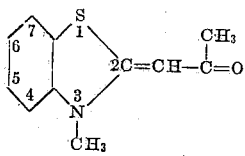

0.25 g. (1 mol.) of 2-diacetylmethylene-3-methylbenzothiazoline was placed in 5 cc. of concentrated hydrochloric acid. The mixture was heated for 50 minutes at 100° C. The reaction mixture was chilled, and then made alkaline with sodium hydroxide solution. The solid ketone was collected on a filter and washed with water. The yield was 98%. After one crystallization from ligroin (boiling point 90° to 120° C.), the ketone was obtained as nearly colorless crystals, melting at 160° to 161° C. Yield 82%.

The 2-diacetylmethylene-3-methylbenzothiazoline employed above was prepared as follows: 7.34 g. (1 mol.) of 2-methylmercaptobenzothiazole metho-p-toluenesulfonate and 6 g. (3 mol.) of acetylacetone were placed in 10 cc. of absolute ethyl alcohol containing 2.12 g. (1.05 mol.) of triethylamine. The mixture was boiled, under reflux, for 10 minutes. Upon chilling the reaction mixture and diluting it with water (75 cc.), the diacetylmethylene derivative which separated out was collected on a filter and washed with water. Yield 67%. After two recrystallizations from 95% ethyl alcohol (4 cc. per gram of product), it was obtained, in 38% yield, as colorless needles melting at 140° to 141° C.

EXAMPLE 2. — *2-acetylmethylene-1-ethyl-1,2-dihydroquinoline*

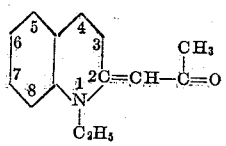

18.75 (1 mol.) of 2-methylmercaptoquinoline etho-p-toluenesulfonate and 15 g. (3 mol.) of acetylacetone were placed in 7 cc. of absolute ethyl alcohol containing 5.3 g. (1.05 mol.) of triethylamine. The mixture was boiled, under reflux, for 15 minutes. The cooled reaction mixture was extracted three times with three 15° cc. portions of petroleum ether. The brownish liquid remaining after the extractions was dissolved in 35 cc. of concentrated hydrochloric acid (sp. g. 1.18). The solution was heated at 100° C. for 50 minutes. After removing most of the hydrochloric acid by distillation in vacuo, the residue was dissolved in cold water, and the solution was made alkaline with ammonium hydroxide solution. Upon chilling the alkaline solution, much solid ketone separated. It was collected on a filter and washed with water. Yield 68%. After two recrystallizations from ligroin (boiling point 90° to 120° C.), it was obtained, in 52% yield, as reddish crystals, melting at 143° to 144° C. with decomposition.

EXAMPLE 3.—*4-acetylmethylene-1-methyl-1,4-dihydroquinoline*

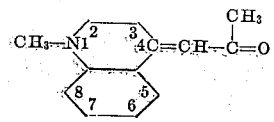

4.74 g. (1 mol.) of 4-phenylmercaptoquinoline and 3.72 g. (1 mol.) of methyl-p-toluenesulfonate were heated together at about 95° C. for 4 hours. The resulting solid quaternary salt was dissolved in 10 cc. of hot absolute ehtyl alcohol. The solution was chilled and 2.2 g. (1.1 mol.) of acetylacetone and 2.2 g. (1.1 mol.) of triethylamine were added. The reaction mixture was boiled, under reflux, for 20 minutes.

The majority of the liquids were removed from the reaction mixture by distillation in vacuo. The residue of crude 4-diacetylmethylene-1-methyl-1,4-dihydroquinoline was dissolved in 15 cc. of concentrated hydrochloric acid. The solution was boiled, under reflux, for 5 minutes. The mixture was chilled to about 0° C. and treated with an excess of sodium hydroxide solution. After chilling the resulting mixture, the ketone was collected on a filter and washed with cold water. The yield was 89%. The ketone was twice recrystallized from ligroin (boiling point 90° to 120° C.), and obtained, in 28% yield, as brown crystals, melting at 138° to 143° C. with decomposition.

In a manner similar to that illustrated in the above examples 2-acetylmethylene-3-phenylbenzothiazoline can be prepared from 2-diacetylmethylene-3-phenylbenzothiazoline. This diacetylmethylene compound can be prepared by condensing acetylacetone with 2-methylmercapto-3-phenylbenzothiazolium-p-toluenesulfonate. This 2-methylmercapto compound can be prepared by treating 3-phenyl-2-thiobenzothiazoline with methyl-p-toluenesulfonate as described in the copending application of L. G. S. Brooker and W. W. Williams, Serial No. 353,501, filed August 21, 1940.

What we claim as our invention and desire to be secured by Letters Patent of the United States is:

1. A process for preparing a ketone comprising hydrolyzing a compound of the following general formula:

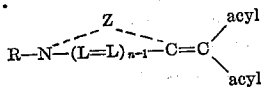

wherein L represents a methine group, $n$ represents a positive integer of from one to three, R represents a member selected from the group consisting of alkyl and aryl groups and Z represents the non-metallic atoms necessary to complete an organic heterocyclic nucleus, and the acyl groups each contain at least two carbon atoms.

2. A process for preparing a ketone comprising hydrolyzing, in the presence of an acid, a compound of the following general formula:

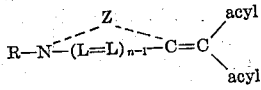

wherein L represents a methine group, $n$ represents a positive integer of from one to three, R represents a member selected from the group consisting of alkyl and aryl groups and Z represents the non-metallic atoms necessary to complete an organic heterocyclic nucleus, and the acyl groups each contain at least two carbon atoms.

3. A process for preparing a ketone comprising hydrolyzing, in the presence of hydrochloric acid, a compound of the following general formula:

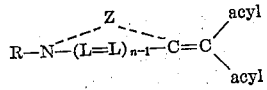

wherein L represents a methine group, $n$ represents a positive integer of from one to three, R represents a member selected from the group consisting of alkyl and aryl groups and Z represents the non-metallic atoms necessary to complete an organic heterocyclic nucleus, and the acyl groups each contain at least two carbon atoms.

4. A process for preparing a ketone comprising hydrolyzing, in the presence of an acid, a compound of the following general formula:

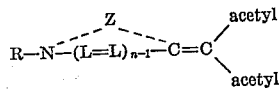

wherein L represents a methine group, $n$ represents a positive integer of from one to three, R represents a member selected from the group consisting of alkyl and aryl groups and Z represents the non-metallic atoms necessary to complete an organic heterocyclic nucleus.

5. A process for preparing a ketone comprising hydrolyzing, in the presence of hydrochloric acid, a compound of the following general formula:

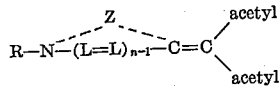

wherein L represents a methine group, $n$ represents a positive integer of from one to three, R represents a member selected from the group consisting of alkyl and aryl groups and Z represents the non-metallic atoms necessary to complete an organic heterocyclic nucleus.

6. A process for preparing a ketone comprising hydrolyzing, in the presence of an acid, a compound of the following general formula:

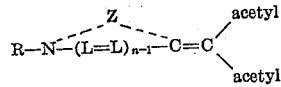

wherein L represents a methine group, $n$ represents a positive integer of from one to three, R represents an alkyl group and Z represents the non-metallic atoms necessary to complete an organic heterocyclic nucleus.

7. A process for preparing a ketone comprising hydrolyzing, in the presence of hydrochloric acid, a compound of the following general formula:

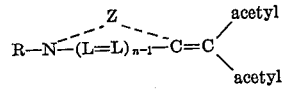

wherein L represents a methine group, $n$ represents a positive integer of from one to three, R represents an alkyl group and Z represents the non-metallic atoms necessary to complete an organic heterocyclic nucleus.

8. A process for preparing a ketone comprising hydrolyzing, in the presence of an acid, a 2-diacetylmethylene-3-alkylbenzothiazoline.

9. A process for preparing a ketone comprising hydrolyzing, in the presence of hydrochloric acid, a 2-diacetylmethylene-3-alkylbenzothiazoline.

10. A process for preparing a ketone comprising hydrolyzing, in the presence of an acid, a 2-diacetylmethylene-1-alkyl-1,2-dihydroquinoline.

11. A process for preparing a ketone comprising hydrolyzing, in the presence of hydrochloric acid, a 2-diacetylmethylene-1-alkyl-1,2-dihydroquinoline.

12. A process for preparing a ketone comprising hydrolyzing, in the presence of an acid, a 4-diacetylmethylene-1-alkyl-1,4-dihydroquinoline.

13. A process for preparing a ketone comprising hydrolyzing, in the presence of hydrochloric acid, a 4-diacetylmethylene-1-alkyl-1,4-dihydroquinoline.

14. A ketone characterized by the following general formula:

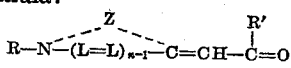

wherein L represents a methine group, $n$ represents a positive integer of from one to two, R and R' represents alkyl groups and Z represents the non-metallic atoms necessary to complete a dihydroquinoline nucleus.

15. A ketone characterized by the following general formula:

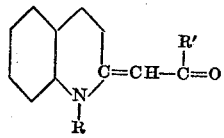

wherein R and R' represent alkyl groups.

16. A ketone characterized by the following general formula:

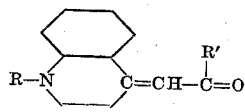

wherein R and R' represent alkyl groups.

17. A 2-acetylmethylene-1-alkyl-1,2-dihydroquinoline.
18. A 4-acetylmethylene-1-alkyl-1,4-dihydroquinoline.
19. 2-acetylmethylene-1-ethyl-1,2-dihydroquinoline.
20. 4-acetylmethylene-1-methyl-1,4-dihydroquinoline.

LESLIE G. S. BROOKER.
FRANK L. WHITE.